United States Patent
Aikawa et al.

(10) Patent No.: US 9,264,568 B1
(45) Date of Patent: Feb. 16, 2016

(54) IMAGE READING APPARATUS AND MEDIUM

(71) Applicant: FUJI XEROX CO., LTD., Tokyo (JP)

(72) Inventors: Kiyofumi Aikawa, Kanagawa (JP); Michio Kikuchi, Kanagawa (JP); Hideki Moriya, Kanagawa (JP); Masaki Hachisuga, Kanagawa (JP); Takashi Hiramatsu, Kanagawa (JP); Kazuya Fukunaga, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/628,451

(22) Filed: Feb. 23, 2015

(30) Foreign Application Priority Data

Aug. 25, 2014 (JP) .................. 2014-170635

(51) Int. Cl.
*H04N 1/04* (2006.01)
*H04N 1/028* (2006.01)
*H04N 1/00* (2006.01)

(52) U.S. Cl.
CPC ........... *H04N 1/028* (2013.01); *H04N 1/00968* (2013.01)

(58) Field of Classification Search
CPC ........................... H04N 1/028; H04N 1/00968
USPC .................. 358/3.03, 1.9, 474, 461
See application file for complete search history.

(56) References Cited

U.S. PATENT DOCUMENTS

| 6,480,625 B1 | 11/2002 | Yamazaki | |
|---|---|---|---|
| 2005/0206982 A1 | 9/2005 | Hattori | |
| 2015/0281503 A1* | 10/2015 | Hori | H04N 1/02805 358/509 |
| 2015/0281504 A1* | 10/2015 | Hori | H04N 1/02885 358/461 |

FOREIGN PATENT DOCUMENTS

| JP | 2000-92326 A | 3/2000 |
|---|---|---|
| JP | 2000-253268 A | 9/2000 |
| JP | 2005-260305 A | 9/2005 |

* cited by examiner

*Primary Examiner* — Houshang Safaipour
(74) *Attorney, Agent, or Firm* — Sughrue Mion, PLLC (57) ABSTRACT

Provided is an image reading apparatus, including a reading portion which reads an image and generates gradation values of each pixel, a calculation portion which calculates a coefficient group that allows the gradation values of each pixel generated as the reading portion reads a reference image, to be close to the gradation values of the pixels which correspond to image data forming the reference image, divides plural regions including an overlapped part in which the reference images are overlapped with each other, and calculates the coefficient group in each region, and a correction portion which corrects the gradation values of each pixel generated as the reading portion reads a correction target image, and corrects the gradation values of the correction target which correspond to the gradation values of the pixels of the overlapped part using the coefficient group.

9 Claims, 6 Drawing Sheets

IMAGE READING APPARATUS AND MEDIUM

CROSS-REFERENCE TO RELATED APPLICATIONS

This application is based on and claims priority under 35 USC 119 from Japanese Patent Application No. 2014-170635 filed Aug. 25, 2014.

BACKGROUND

Technical Field

The present invention relates to an image reading apparatus and a medium.

SUMMARY

According to an aspect of the invention, there is provided an image reading apparatus, including:

a reading portion which reads an image and generates gradation values of each pixel;

a calculation portion which calculates a coefficient group that allows the gradation values of each pixel generated as the reading portion reads a reference image which becomes a reference of correction, to be close to the gradation values of the pixels which correspond to image data forming the reference image, divides plural regions including an overlapped part in which the reference images are overlapped with each other, and calculates the coefficient group in each region; and a correction portion which corrects the gradation values of each pixel generated as the reading portion reads a correction target image to be a target of correction, and corrects the gradation values of the correction target which correspond to the gradation values of the pixels of the overlapped part using the coefficient group calculated by the calculation portion in each region including the overlapped part.

BRIEF DESCRIPTION OF THE DRAWINGS

Exemplary embodiments of the present invention will be described in detail based on the following figures, wherein.

DETAILED DESCRIPTION

1. Exemplary Embodiment

1-1. Entire Configuration of Image Reading Apparatus

Hereinafter, an image reading apparatus 9 according to an exemplary embodiment of the invention will be described. In the drawings, a space in which each configuration of the image reading apparatus 9 is disposed is illustrated as an xyz right-handed coordinate space. Among the coordinate symbols illustrated in the drawings, the symbols which draw dots in a circle illustrate an arrow toward a near side from a paper surface inner side. In the space, a direction along an x axis is called an x axis direction. In addition, among the x axis directions, a direction in which the number of x components increases is called a +x direction, a direction in which the number of x components decreases is called a −x direction. Regarding y and z components, along with the definitions described above, a y axis direction, a +y direction, a −y direction, and z axis direction, a +z direction, and a −z direction are defined.

Figure 1:
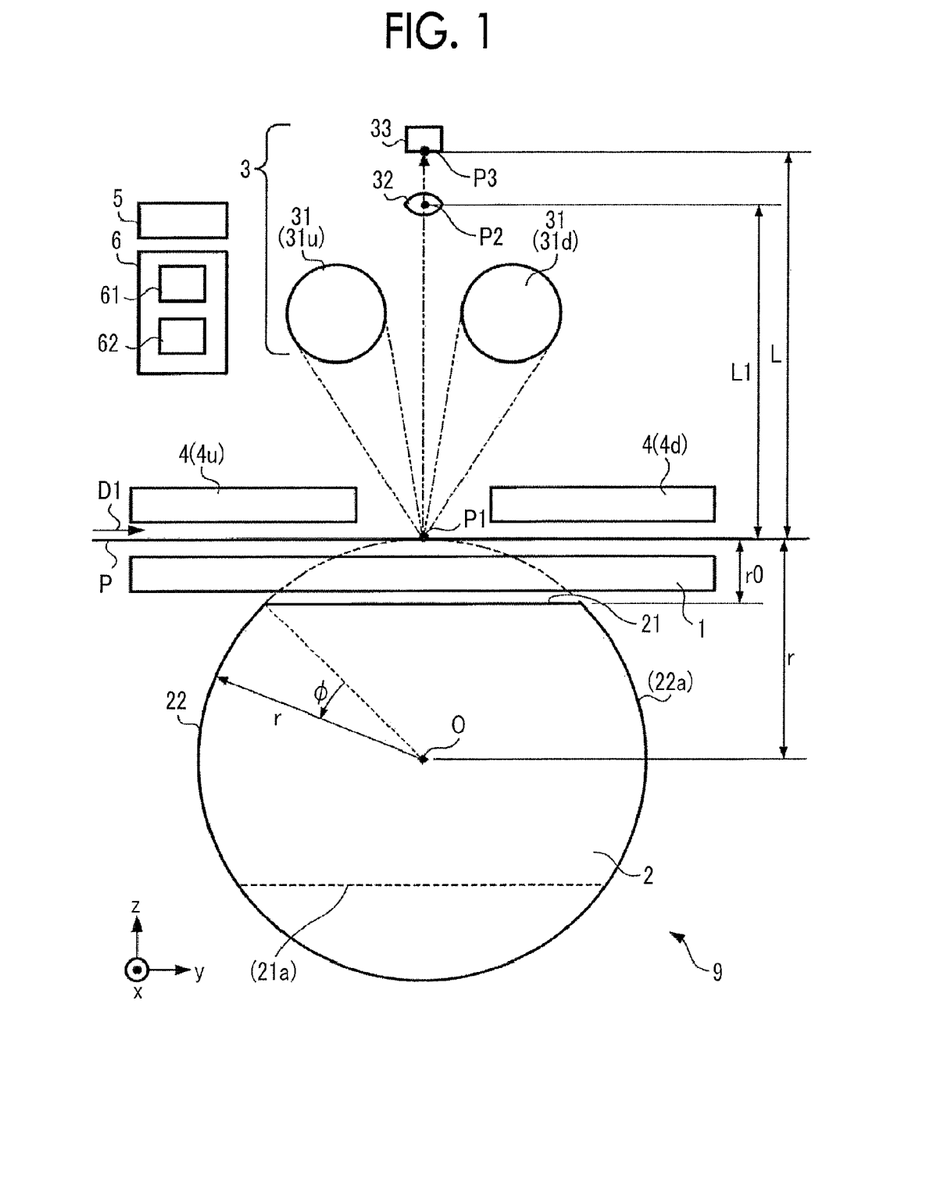
FIG. 1 is a view illustrating a main configuration of an image reading apparatus according to an exemplary embodiment of the invention.

FIG. 1 is a view illustrating a main configuration of the image reading apparatus 9 according to an exemplary embodiment of the invention. The image reading apparatus 9 includes a guiding plate 1, a holding member 2, a reading portion 3, a shielding plate 4, a control portion 5, and a storing portion 6.

The guiding plate 1 is a member which guides a medium, such as a paper P. The guiding plate 1 is disposed in parallel to an xy plane, and guides the paper P transported in a transporting direction D1 which is the +y direction to a reading position P1, by a surface on the +z direction side. The reading position P1 is a position where the reading portion 3 reads an image. The guiding plate 1 may move along the y axis direction, and guides the paper P when the guiding plate 1 is at a position (hereinafter, referred to as a first position) illustrated in FIG. 1.

The holding member 2 is a member which holds a color sample. The color sample is a sample which is used in correcting a color of the image reading apparatus 9, and one color sample displays one color (true color) which is a reference of correction of the color.

When the guiding plate 1 is at the first position, the holding member 2 is on a side (−z direction) which faces the guiding plate 1 when viewed from the reading portion 3. However, as the guiding plate 1 moves according to a movement, the held color sample is rotated to the reading position P1 at which the reading portion 3 may perform reading.

The reading portion 3 includes light sources 31, a lens 32, and an image sensor 33, and generates gradation values of each pixel by reading the image. The light sources 31 include a light source 31u which irradiates the reading position P1 with irradiation light from an upstream side (−y direction) of a transporting direction of the paper P, and a light source 31d (hereinafter, when there is no distinction between the light source 31u and the light source 31d, simply referred to as the "light source 31") which irradiates the reading position P1 with irradiation light from a downstream side (+y direction) of the transporting direction of the paper P. As the reading position P1 is irradiated with the two types of the light sources 31, an image having less unevenness and deviation than in a case where the irradiation is performed by one of the light sources 31, is read. In addition, the light source 31u and the light source 31d may have plural light-emitting sources which are respectively aligned along the x axis direction.

Figure 2:
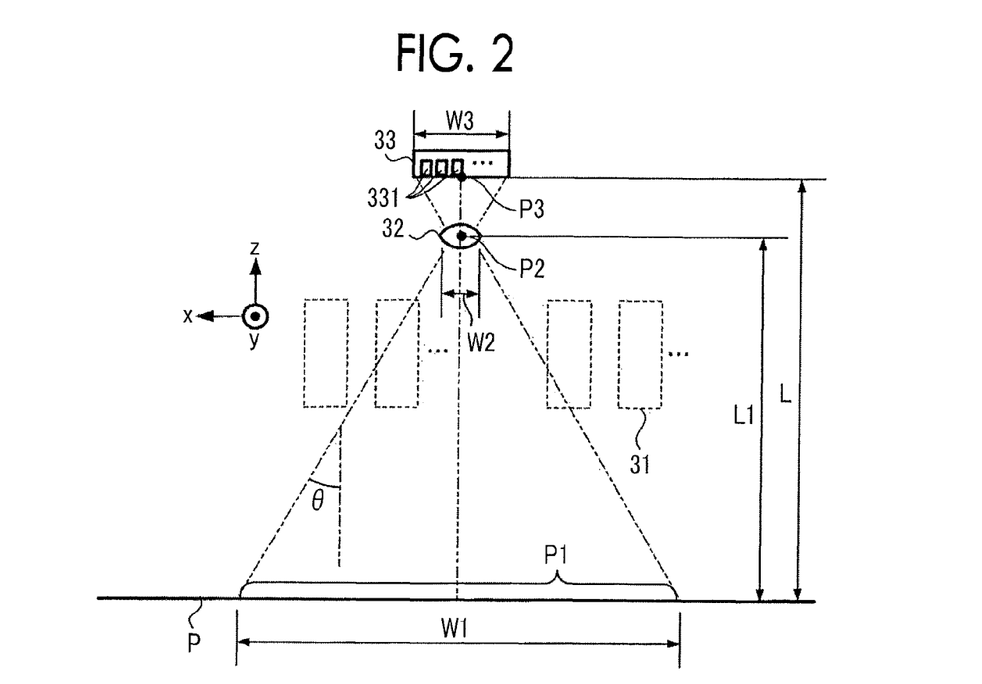
FIG. 2 is a view of a reading portion in FIG. 1 when viewed in a −y direction.

The lens 32 is an example of a reduction optical system which reduces the image of the reading position P1 having a width in the x axis direction. FIG. 2 is a view of the reading portion 3 in FIG. 1 when viewed in the −y direction. The image of the reading position P1 has a width W1 in the x axis direction. The lens 32 is at a position of a distance L1 from the paper P, and reduces the image of the reading position P1 to a size at which the image sensor 33 at a position of a distance L from the paper P may perform sensing. In FIG. 2, the lens 32 has a width W2 (W2<W1) in the x axis direction, and the image sensor 33 has a width W3 (W3<W1) in the x axis direction. Therefore, as illustrated in FIG. 2, the reading portion 3 reads the image of the reading position P1 which is in a sensing range of an angle θ.

The image sensor 33 is configured to read the image formed on the paper P by receiving reflected light from the reading position P1, via the lens 32. The image sensor 33 illustrated in FIG. 2 is a so-called line sensor, and has plural image sensor elements 331 which are aligned in parallel in the x axis direction. These plural image sensor elements 331 are charge coupled device (CCD) image sensor, and are manufactured via plural processes in various types of environments.

The shielding plate 4 is a plate which shields a part other than the reading position P1 from the light sources 31, on the media, such as the paper P. As shielding is performed, the reflected light of the reading position P1 is unlikely to be interfered by the reflected light of other parts.

The shielding plate 4 may have a function of restricting a range of motion of the medium. As the shielding plate 4 nips the paper P which is the medium together with the guiding plate 1, a position of the paper P in the z axis direction is stable compared to a case where the shielding plate 4 is not provided. In addition, the image reading apparatus 9 may dispose a restriction member which mainly has a function of restricting the range of motion of the medium, instead of the shielding plate 4.

The control portion 5 is a unit which controls operations of each portion of the image reading apparatus 9. The control portion 5 is provided with an execution processing device, such as a central processing unit (CPU), or a storage device, such as, a read only memory (ROM) or a random access memory (RAM), and executes a program which is stored in these storage devices. The control portion 5 moves the guiding plate 1 along the y axis direction by controlling a driving portion (not illustrated), and rotates the holding member 2 around an axis O by controlling a rotating portion (not illustrated). The driving portion and the rotating portion have a power source, such as a motor, and a power transmission mechanism, such as a toothed wheel.

The storing portion 6 is a storing unit having a large volume, such as a hard disc, and stores a program which is read in by the control portion 5. In addition, the storing portion 6 stores a reference value table 61 and a profile table 62. The reference value table 61 is a table which associates the reference values of the plural color samples held by the holding member 2 with positions of each color sample. The reference value is the gradation value which illustrates the true color of the color sample, and is measured by a spectrophotometer in advance.

The profile table 62 is a table which describes a color correction profile calculated in each of plural regions on the medium. The color correction profile is a parameter group (coefficient group) for correcting each of the gradation values forming the image read by the reading portion 3 to be close to the gradation values of the true colors.

In addition, the storing portion 6 may include a so-called removal disc, that is, a recording medium which is attachable and detachable.

1-2. Position Dependence of Image Reading

The image reading by the reading portion 3 depends on a position of the image. For example, even when different positions on the paper P are coated with the same pigments, there is a case where the gradation value which is a result of reading is different according to the position. There are the following three reasons thereof, for example.

The first reason is unevenness of the light sources 31. The light sources 31 are, for example, light emitting diodes (LED), and are manufactured via the plural processes in the various types of environments. For this reason, in the plural light sources 31, there is a case where differences of manufacturing conditions in each process are respectively accumulated, and unevenness in a light color or brightness is generated.

As illustrated in FIG. 2, when the plural light sources 31 are aligned in parallel along the x axis direction, each reflection point of the reading position P1 receives and reflects a large amount of light from the light source 31 which is close to the position, rather than the light source 31 which is far from the position. As a result, since the image of the reading position P1 reflects the light having different light colors and brightness according to the position of the image, there is a case where the read gradation values of each pixel are different from each other depending on the position of the image.

Figure 3A:
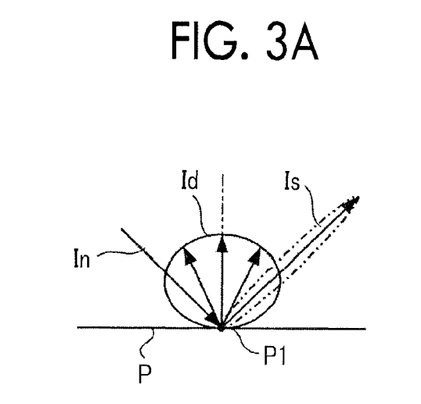
FIGS. 3A and 3B are views illustrating spectral reflection characteristics.
Figure 3B:
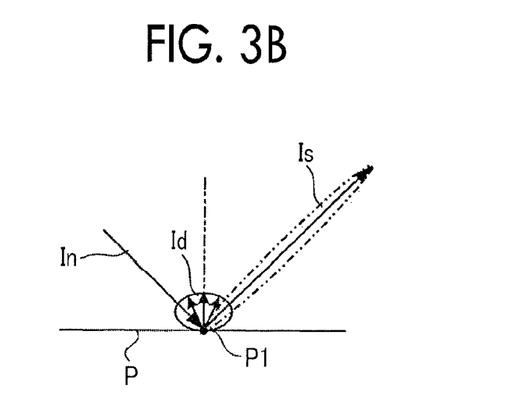

The second reason is a difference of a reflection angle. The image of the reading position P1 is formed, for example, as a toner is fixed on a front surface of the paper P, but there is a difference in spectral reflection characteristics between a paper surface and a toner layer. The spectral reflection characteristics are a ratio between dispersion reflection components and regular reflection components, or the like. FIGS. 3A and 3B are views illustrating the spectral reflection characteristics. FIG. 3A is a view illustrating the reflection on the paper surface, and FIG. 3B is a view illustrating the reflection on the toner layer.

In FIGS. 3A and 3B, incident light In is light which is incident on the reading position P1. Regular reflection light Is is light which is reflected at the same reflection angle as the incident angle of the incident light In, at the reading position P1. Dispersion reflection light Id is light which is reflected at various angles at the reading position P1. On the paper surface illustrated in FIG. 3A, compared to the toner layer illustrated in FIG. 3B, a ratio of the dispersion reflection light Id is large. As illustrated in FIG. 2, since the image of the reading position P1 has different reflection angles of the reflected light toward the lens 32 according to the position of the image in the x axis direction, there is a case where the read gradation values of each pixel are different from each other depending on the position of the image.

The third reason is unevenness of the image sensor element 331. As described above, since the image sensor element 331 is manufactured via the plural processes in the various types of environments, there is a case where the differences in the manufacturing conditions in each process are respectively accumulated, and unevenness in sensitivity is generated. As a result, since the image of the reading position P1 is sensed at a different sensitivity according to the position of the image, there is a case where the read gradation values of each pixel are different from each other depending on the position of the pixel.

1-3. Configuration for Color Correction

In order to make the image reading by the reading portion 3 difficult to be influenced by the position of the image, it is required that the color correction be performed with respect to the reading portion 3. The color correction is performed by using the color sample held by the holding member 2.

The holding member 2 has a side surface in a shape which is obtained by cutting a column having a radius r around the axis O along a direction of the axis O so as not to come into contact with the guiding plate 1 when disposed in the first position. The axis O is provided in a direction which intersects a direction (+y direction) in which the paper P is guided, and is provided along the x axis direction in FIG. 1. On the side surfaces of the holding member 2, a part which is formed by cutting the above-described column is called a first side surface 21, and a part other than the first side surface 21 is called a second side surface 22.

In addition, in description above, the holding member 2 has the side surface in a shape which is obtained by cutting the column having the radius r around the axis O along the direction of the axis O, but in practice, is not limited to a member which is formed by cutting the column. The holding member 2 may be formed, for example, by performing injection molding of resin or the like into a mold which corresponds to the above-described shape.

In addition, the holding member 2 may have a hollow on a side closer to the axis O than the first side surface 21. In other words, the side surface of the holding member 2 may have a shape which is obtained by cutting a cylinder having the radius r from the axis O to an outer circumferential surface along the direction of the axis O.

In addition, when the holding member 2 has the hollow, the shape before cutting is not limited to the cylinder, and for example, may be a shape which has the hollow in a shape along the first side surface 21 and the second side surface 22 of the holding member 2. In short, the shape of the holding member 2 before cutting may have a circular outer circumference when cutting by a surface which perpendicularly intersects the axis O.

When the guiding plate 1 is at the first position, the holding member 2 illustrated in FIG. 1 has a mode in which the first side surface 21 faces the +z direction. As the holding member 2 has such a mode, the space having a distance r0 (<r) of width in the −z direction from the reading position P1 is formed. Since a thickness of the guiding plate 1 is smaller than the distance r0, the guiding plate 1 does not come into contact with the holding member 2 even when the guide plate 1 moves in the space.

The second side surface 22 has a larger area than that of the first side surface 21. In the second side surface 22, plural color charts are held in a state of being aligned along the x axis. The color chart is a reference image in which plural types of color samples which make one group are respectively aligned at determined positions, and is used as a reference of correction of the read color by the reading portion 3.

Figure 4:
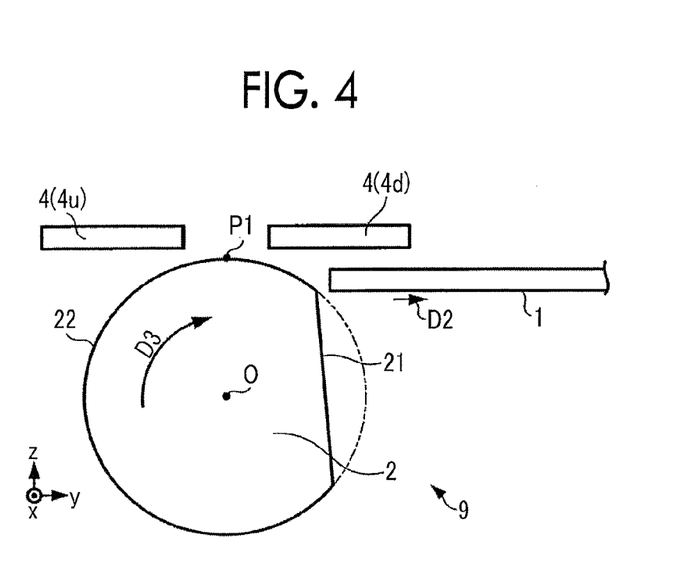
FIG. 4 is a view illustrating a movement of a guiding plate.

FIG. 4 is a view illustrating a movement of the guiding plate 1. Other than the first position illustrated in FIG. 1, the guiding plate 1 may move to a position (hereinafter, referred to as a second position) illustrated in FIG. 4. The guiding plate 1 which is at the first position moves along a moving direction D2 (+y direction) illustrated in FIG. 4, and reaches the second position. The image reading apparatus 9 moves the guiding plate 1 to the first position by the driving portion which is not illustrated when the image formed on the paper P is read by the reading portion 3, and guides the paper P to the guiding plate 1.

Meanwhile, the image reading apparatus 9 moves the guiding plate 1 to the second position by the above-described driving portion when the color sample held on the second side surface 22 of the holding member 2 is read by the reading portion 3. The second position is apart from the axis O by more than the radius r. In other words, even when the holding member 2 rotates around the axis O, the second position is a position which is apart from the axis O by an extent that the guiding plate 1 does not come into contact with the holding member 2.

When the guiding plate 1 is at the second position, the rotating portion which is not illustrated rotates the holding member 2 in a rotating direction D3. Since the reading position P1 is apart from the axis O by a distance which corresponds to the radius r in the +z direction, by this rotation, the second side surface 22 which is a side surface apart from the axis O by the radius r moves to the reading position P1. In other words, the color sample which is held on the second side surface 22 of the holding member 2 moves to the reading position P1. The control portion 5 allows the reading portion 3 to read the color sample moved to the reading position P1, and performs calculation of a coefficient group which is used in correcting the color. In addition, the rotating direction D3 in FIG. 4 is clockwise around the axis O.

Figure 5:
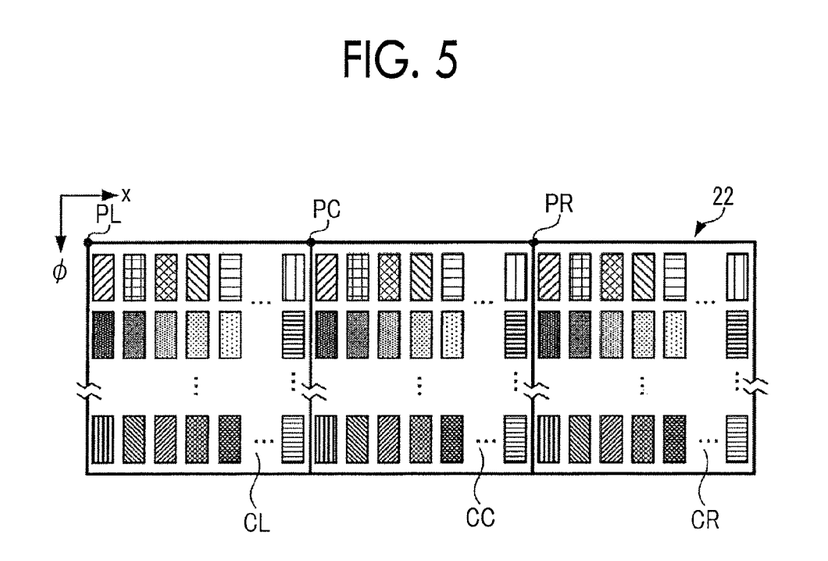
FIG. 5 is a view illustrating plural color charts held on a second side surface.

FIG. 5 is a view illustrating plural color charts held on the second side surface 22. In FIG. 5, a horizontal axis illustrates the x axis direction, and a vertical direction illustrates an angle φ illustrated in FIG. 1. The angle φ is an angle which illustrates a position of a circumferential direction around the axis O.

As illustrated in FIG. 5, on the second side surface 22, three color charts CL, CC, and CR (hereinafter, simply referred to as a "color chart" when it is not necessary to distinguish these color charts) are aligned and held in order in the +x direction. These color charts are, for example, images formed based on common data, and a difference of coloring of the color samples disposed at corresponding positions is below a determined threshold value. The corresponding positions are referred to as corresponding positions when each of original points in each of the color charts is used as a reference in a case where an original point of the color chart CL is a point PL, an original point of the color chart CC is a point PC, and an original point of the color chart CR is a point PR.

All of the point PL, the point PC, and the point PR have a common position on an φ axis, and both a distance between the point PL and the point PC and a distance between the point PC and the point PR correspond to a length of one color chart in the x axis direction. Therefore, for example, both a certain point of the color chart CL and a point which corresponds to the certain point in color chart CC have a common position on the φ axis, and an interval therebetween in the x axis direction has a length of one color chart in the x axis direction.

Figure 6:
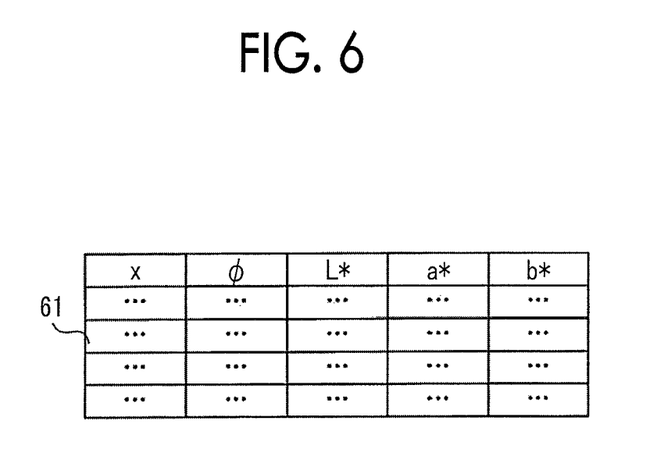
FIG. 6 is a view illustrating an example of a reference value table.

The reference values of the plural color samples included in the three color charts illustrated in FIG. 5 are stored in the reference value table 61, being associated with positions of each color sample on the second side surface 22. FIG. 6 is a view illustrating an example of the reference value table 61. As illustrated in FIG. 6, in the reference value table 61, a group of x and φ is described as a coordinate illustrating a position on the second side surface 22, and each value of L*, a*, and b* in a L*a*b* color space (CIELAB color space) of CIE1976 is described as the reference value of the color sample disposed on this coordinate. The CIELAB color space is a color space in a color system determined by Commission International de l'Eclairage (CIE). In addition, the color space in which the color sample is described is not limited to the CIELAB color space, and for example, may be another color space which is called a CIELUV color space. In addition, the coordinate which illustrates the position on the second side surface 22 described in the reference value table 61 may correspond to each pixel in the image data forming the reference image in which the above-described three color charts are aligned in the x axis direction.

1.4 Functional Configuration of Image Reading Apparatus

Figure 7:
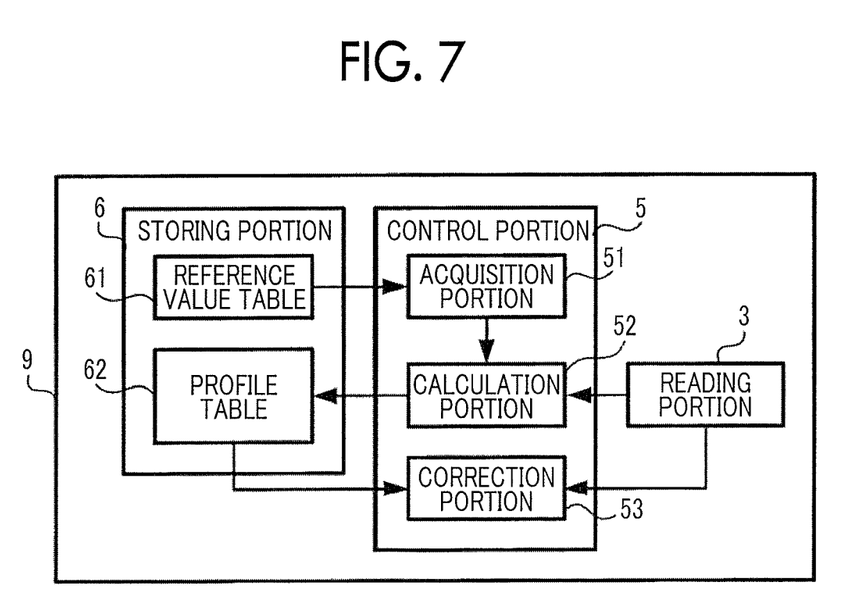
FIG. 7 is a view illustrating a functional configuration of the image reading apparatus.

FIG. 7 is a view illustrating a functional configuration of the image reading apparatus 9. By executing the above-described program, the control portion 5 functions as an acquisition portion 51, a calculation portion 52, and a correction portion 53.

The acquisition portion 51 specifies a position on the second side surface 22 of the color chart which is read by the reading portion 3 based on the rotation angle or the like of the holding member 2, and acquires the reference value of the color sample including a pixel disposed at this position from the reference value table 61 of the storing portion 6. In other words, the acquisition portion 51 acquires each of gradation values of the pixels at specified positions, in the image data forming the reference image which is a correction reference. The calculation portion 52 calculates the color correction profile, from the gradation value of the color chart read by the reading portion 3 and the reference value which corresponds to the gradation value acquired by the acquisition portion 51. As described above, the color correction profile is a coefficient group to make the gradation values of each pixel, generated as the reading portion 3 reads the color chart close, to the gradation value (reference value) of the corresponding pixel in the image data illustrating the color chart.

The color correction profile is calculated as follows, for example. The reading portion 3 outputs the gradation value of the read color chart as data which is illustrated by a red green blue (RGB) color system. The calculation portion 52 calculates a matrix with which each value of $L^*$, $a^*$, and $b^*$ are close to the reference value at a position of the gradation value, as the color correction profile, in a case of an inner product operation with respect to a vector having a total of 10 elements, including the gradation values R, G, and B, square numbers of each of the gradation values $R^2$, $G^2$, and $B^2$, multiplication values of two of the gradation values R×G, G×B, and B×R, and 1 which indicates a constant term. This matrix is an example of the coefficient group which is used in correction of the gradation value generated as the reading portion 3 reads the image, and has 3 rows and 10 columns of elements in this case. In addition, the gradation value of the read color chart may be output as data which is illustrated by the color system other than the RGB color system. In addition, the number of the elements of the vector generated from the gradation value of the read color chart is not limited to 10 which is described above.

In calculating the color correction profile, a statistic method, such as a multiple regression analysis, linear programming, or non-linear programming may be used. Here, the color correction profile is calculated in each preset region on the second side surface 22.

Figure 8:
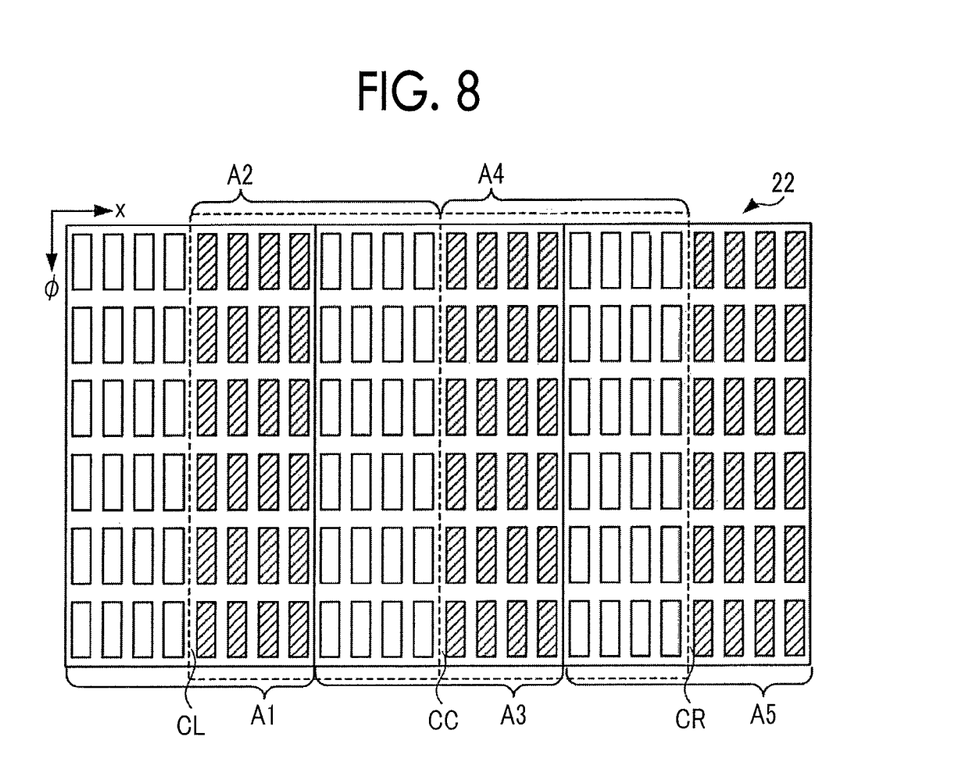
FIG. 8 is a view illustrating an example of plural regions determined on the second side surface.

FIG. 8 is a view illustrating an example of plural regions determined on the second side surface 22. As illustrated in FIG. 8, in all of the three color charts, a total of 48 color samples including 8 rows of the color samples in the x axis direction and 6 columns of the color samples in a ϕ direction are respectively disposed. Each color type of these color samples is designed so that deviation in the determined limited color space is small. By making the plural color samples as one group, the calculation of the color correction profile is performed. The color charts CL, CC, and CR respectively correspond to regions A1, A3, and A5.

Here, if the 8 rows of each color chart in the x axis direction is distinguished as four rows (left half) on the −x direction side and four rows (right half) on the +x direction side, regions of the right half of each color chart have a common configuration, and regions of the left half of each color chart have a common configuration.

A region which is combined by the region of the right half of the color chart CL and the region of the left half of the color chart CC is a region A2, and a region which is combined by the region of the right half of the color chart CC and the region of the left half of the color chart CR is a region A4.

The region A2 and the region A4 are regions which have a part (overlapped part) which is overlapped with any one of the regions A1, A3, and A5. Since the plural color samples which have common types and numbers with the regions A1, A3, and A5 are included even in the region A2 and the region A4, the color correction profiles are respectively calculated.

The calculation portion 52 divides the three color chats held on the second side surface 22 into the plural regions including the overlapped part in which the three color charts held on the second side surface 22 are overlapped with each other, and calculates the color correction profiles for each region. For this reason, compared to a case where each of the color correction profiles is calculated only from the region in which the color charts are not overlapped with each other, more color correction profiles may be obtained.

Figure 9:
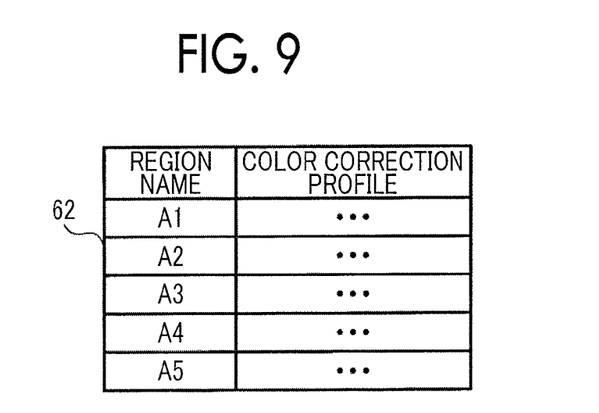
FIG. 9 is a view illustrating an example of a profile table.

Each of the color correction profiles calculated for each region is associated with the regions and is stored in the profile table 62. FIG. 9 is a view illustrating an example of the profile table 62. As illustrated in FIG. 9, the profile table 62 stores the color correction profile by associating the color correction profile with the region name which identifies the region. The profile table 62 illustrated in FIG. 9 stores each of the color correction profiles regarding 5 regions from the region A1 to the region A5.

The correction portion 53 corrects the gradation values of each pixel generated as the reading portion 3 reads a correction target image to be a target of correction, by using the color correction profile read out from the profile table 62. For example, the reading portion 3 reads the image formed on the paper P or the like, and outputs the gradation value which is illustrated by the RGB color system regarding the plural pixels included in the image. At this time, each pixel specifies the positions in the x axis direction.

Based on the positions of each pixel in the x axis direction which is output by the reading portion 3, the correction portion 53 specifies the entire region including the pixel. In a case where there is one specified region, the correction portion 53 corrects the gradation value thereof by using the color correction profile calculated with respect to the specified region.

Meanwhile, when there are two or more specified regions, in other words, when the specified region is the overlapped part of the plural regions, the correction portion 53 corrects the above-described gradation value by using the color correction profiles respectively calculated in each of two or more regions including the overlapped parts.

For example, with respect to the gradation values at positions included even in both the region A2 and the region A3, the correction portion 53 calculates two correction values by using the color correction profiles which are respectively associated with each of the region A2 and the region A3, and calculates an arithmetical average of the two correction values as the correction value of the gradation value.

Above, as described, since the image reading apparatus 9 according to the exemplary embodiment calculates each of the color correction profiles in each of plural regions overlapped with each other, compared to a case each of the color correction profiles are calculated from the plural regions which are not overlapped with each other, it is possible to use many color correction profiles.

In addition, among the above-described plural regions, regarding the gradation values of the positions at which any two or more regions are overlapped, the correction is performed by using the coefficient groups which are respectively calculated with respect to the two or more regions including the positions. For this reason, regarding the color after the correction, a difference between the region and other adjacent regions via the overlapped part is unlikely to be remarkable, and it is possible to make the color unlikely to be discontinuous.

2. Modification Example

Above, the exemplary embodiment is described, but the contents of the exemplary embodiment may be modified as described below. In addition, the modification examples described below may be combined with each other.

2-1. Modification Example 1

In the exemplary embodiment described above, when two or more regions including the pixels to be the correction target are specified, in other words, when the gradation value of the pixel of the overlapped part is corrected, the correction portion 53 calculates two correction values from the gradation value of the pixel by using the color correction profiles which are respectively calculated in each region including the overlapped part, and calculates the arithmetic average of the two correction values as the correction value of the gradation value. However, with respect to the gradation value of the pixel of the overlapped part, the correction portion 53 may correct the gradation value by using a weighting factor of the pixel with respect to these regions, and the color correction profiles which are respectively calculated in each region.

Figure 10:
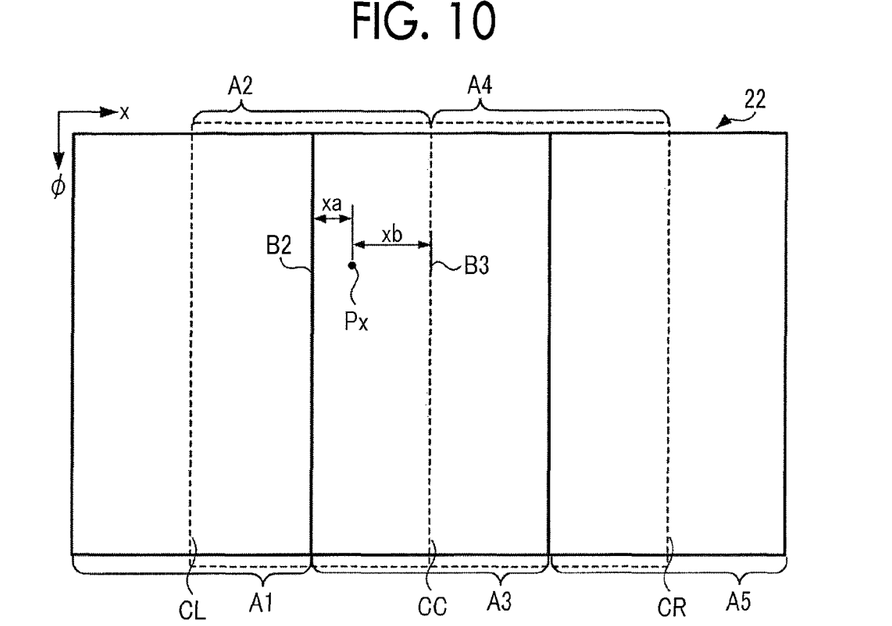
FIG. 10 is a view illustrating a weighting factor of a position of a pixel, with respect to a region including the pixel.

FIG. 10 is a view illustrating the weighting factor of the position of the pixel, with respect to the region including the pixel. As illustrated in FIG. 10, a pixel Px is included in both the region A2 and the region A3. The weighting factor of the pixel in the region A2 is determined based on a line B2 which is a center line of the region A2 in the x axis direction as a reference, and the weighting factor of the pixel in the region A3 is determined based on a line B3 which is a center line of the region A3 in the x axis direction as a reference. In other words, the weighting factor of the pixel included in the region A2 is determined to decrease as much as the pixel is apart from the line B2 along the x axis direction, and the weighting factor of the pixel included in the region A3 is determined to decrease as much as the pixel is apart from the line B3 along the x axis direction.

As illustrated in FIG. 10, the pixel Px is apart from the line B2 by a distance "xa" along the x axis direction, and is apart from the line B3 by a distance "xb" which is larger than the "xa" along the x axis direction. In this case, the pixel Px is closer to the center of the region A2 than to the region A3. Therefore, the weighting factor in the region A2 of the pixel Px becomes bigger than the weighting factor in the region A3.

In addition, for example, by using k which is a positive real number, as described above, if a weighting factor ka in the region A2 of the pixel Px is defined as $ka = k \times exp(-xa^2/2)$, and a weighting factor kb in the region A3 of the pixel Px is defined as $k \times exp(-xb^2/2)$, the weighting factor in the region becomes bigger as much as the pixel is close to the center of the region, and the weighting factor in the region becomes smaller as much as the pixel is apart from the center of the region.

The correction portion 53, for example, may multiply the above-described weighting factor determined in each region, by each component of the color correction profile which is calculated with respect to each of the regions. In this case, as the correction portion 53 performs the inner product operation of the color correction profile obtained by multiplying the weighting factor by the vector having the above-described 10 elements, the correction portion 53 may correct the gradation values in the RGB color system of the color chart read by the reading portion 3, to each value of L*, a*, and b* in the L*a*b* color space.

2-2. Modification Example 2

In addition, when the correction portion 53 corrects the gradation value of the pixel of the overlapped part, any one of the color correction profiles which are respectively calculated in each region including the overlapped part is selected, by using the selected color correction profile, the correction portion 53 may correct the read gradation value with respect to the pixel.

For example, when the correction portion 53 corrects the gradation values of each pixel generated by reading the correction target image to be the target of the correction by the reading portion 3, regarding the gradation value of the pixel of the overlapped part, the correction portion 53 performs correction by using the color correction profile selected as described below. In other words, the correction portion 53 obtains, in each region, a representative value of a difference between the gradation values of each pixel generated as the reading portion 3 reads the color chart and the gradation value (reference value) of the corresponding pixel in the image data illustrating the color chart. Based on each of the obtained representative values, the correction portion 53 selects any one of the color correction profiles calculated in each region, and performs the correction with respect to the gradation value of the pixel of the overlapped part by using the selected color correction profile.

In this case, the correction portion 53 may use a quantile as the representative value of the difference. For example, the correction portion 53 may align absolute values of the difference between the gradation values obtained by reading the color chart and the reference value of the color chart in order of size, and may obtain ΔE95% which is the difference that is divided so that the 95% of the entire region is included in the small part in each region. Since the region which has small ΔE95% is generally a region which has a small difference between a first gradation value and a second gradation value, the color correction profile which is calculated with respect to the region, rather than the color correction profile which is calculated in the region in which the ΔE95% is large, may correct the read gradation value to the gradation value which illustrates a color which is close to the true color in the entire region (a part which is divided by the quantile, here, 95% of the entire region).

In addition, the correction portion 53 may employ a maximum value as the above-described representative value. For example, the correction portion 53 may obtain a value in which the absolute value of the difference between the gradation value obtained by reading the color chart and the reference value of the color chart is a maximum, that is, the maximum value. Since the maximum value of the difference between the first gradation value and the second gradation value is likely to influence the color correction in the region which has the large maximum value, the color correction profile calculated by employing the region having a small maximum value, rather than the color correction profile calculated in the region having the large maximum value, may correct the read gradation value to the gradation value illustrating the color which is close to the true color without being influenced by the maximum error. In addition, as the representative value of the difference, other mode value or center value may be employed.

2-3. Modification Example 3

Figure 11A:
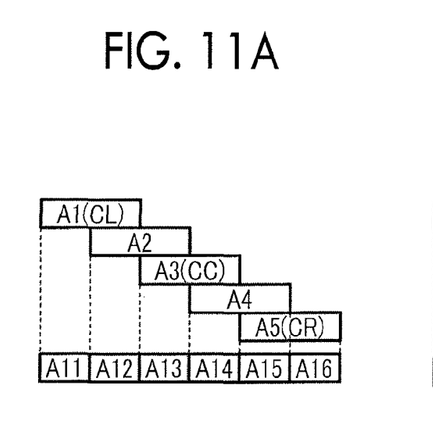
FIGS. 11A and 11B are views illustrating a region in a modification example.
Figure 11B:
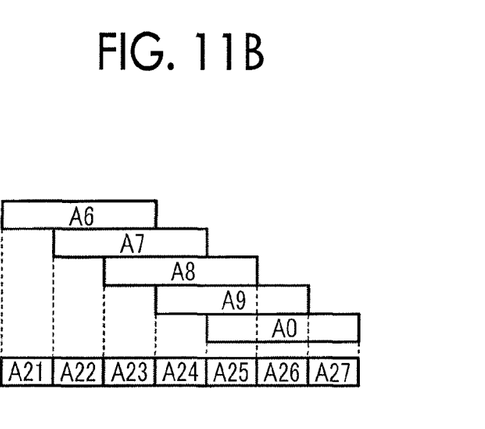

As the color chart, a chart in which three or more regions are overlapped may be used. FIGS. 11A and 11B are views illustrating a region in this modification example. In FIG. 11A, the above-described regions A1 to A5 are illustrated. A left half of the region A1 which corresponds to the color chart CL is a region A11 and a right half is a region A12. In addition, a left half of the region A3 which corresponds to the color chart CC is a region A13, and a right half is a region A14. A left half of the region A5 which corresponds to the color chart CR is a region A15, and a right half is a region A16.

The region A1, the region A3, and the region A5 do not have a part overlapped with each other. Meanwhile, the region A2 in which the left half is the region A12 and the right half is the region A13, and the region A4 in which the left half is the region A14 and the right half is the region A15, are determined. In this case, the region A12 is a region in which the region A1 and the region A2 are overlapped with each other, and the region A13 is a region in which the region A2 and the region A3 are overlapped with each other. In addition, the region A14 is a region in which the region A3 and the region A4 are overlapped with each other, and the region A15 is a region in which the region A4 and the region A5 are overlapped with each other.

In FIG. 11B, an example of the color chart in which three or more regions are overlapped with each other is illustrated. Each region is divided into three parts which are aligned in the x axis direction. For example, in the region A6, a left side part is a region A21, a center part is a region A22, and a right side part is the region A23. Meanwhile, the region A23 is a region of the center part in the region A7, and is a region of the left side part of the region A8. In other words, in a case illustrated in FIG. 11B, the region A23 is a part in which three regions, such as the regions A6, A7 and A8 are overlapped with each other.

In addition, in this case, each of the weighting factors of the left side part, the right side part, and the center part in a certain region may be different from each other. For example, there is a case where the weighting factors of the left side part and the right side part are 0.25, and the weighting factor of the center part is 0.5.

2-4. Modification Example 4

In the above-described exemplary embodiment, in the color chart, total 48 color samples, including 8 columns in the x axis direction and 6 rows in the φ direction, are respectively disposed, but the number of the color samples disposed in one color chart is not limited thereto.

In order to convert the RGB color system to the L*a*b* color system, the color samples having the number which is more than a certain extent is necessary. For example, when each of three axes in the color space is illustrated every 6 dots, 216 color samples which are a cube of 6 are necessary. Therefore, for example, in the color chart, 216 color samples may be aligned in 12 columns in the x axis direction and in 18 rows in the φ direction.

Even in this case, there is a part in which the two adjacent regions are overlapped with each other in the x axis direction, and in each of the plural regions overlapped with each other, each of the color correction profiles is calculated, and thus, more color correction profiles are used compared to a case where each of the color correction profiles is calculated only in the region in which the regions are not overlapped with each other.

2-5. Modification Example 5

In the above-described exemplary embodiment, the holding member 2 which is a member that holds the color sample is an object that has the side surface in a shape which is obtained by cutting the column having the radius r around the axis O along the direction of the axis O, and is a member which is rotated around the axis O. However, the member which holds the color sample is not limited thereto.

For example, the color chart which includes plural color samples may be formed in an endless belt-shaped member, such as a belt built in plural rollers. In this case, the belt-shaped member may circulate. In other words, the color chart is formed in a medium which circulates around the plural rollers, and the reading portion 3 may read the color chart when the medium circulates.

When the chart is formed on a side surface having a polygonal prism shape, and rotation is performed around the axis of a polygonal prism, there is no curvature on the side surface if the polygonal prism is rotated, and a distance between the reading portion 3 and the side surface of the polygonal prism changes. For this reason, only an area limited in a stationary state may be used as the chart region, not as the chart during the rotation. When a chart (a) is formed in the medium which circulates in a column shape or a belt shape, it is possible to use the area as the chart region even when the rotation for maintaining the distance to the reading portion 3 even during the rotation is performed even during the rotation. Compared to a case where the polygonal-shaped chart which faces the reading portion 3 in the same table area is embedded in the reading apparatus, it is possible to widen the effective area as the chart disposition area. Therefore, it is possible to dispose a chart having much more number of colors, and to obtain the color correction profile having excellent accuracy.

In addition, when the color chart is formed on the medium which circulates around the plural rollers, since the color chart is formed on the medium which circulates, compared to a case where the color sample is held by the column-shaped object, an occupied region of the member in the vicinity of the reading portion 3 does not increases, and the effective area as the chart disposition region may increase.

2-6. Modification Example 6

In the above-described exemplary embodiment, regarding the combination of the plural types of color samples which constitute the color chart, it is desirable that the colors of each color sample be dispersed at substantially the same interval in the determined limited color space. For example, when the reference values of each color sample included in each color chart are disposed as dots inside the color space which is divided into the outside and the inside by the determined boundary, if each distance from each dot to the closest dot or the boundary is obtained, any ratio of two distances selected among the distances may be designed to be smaller than the determined value, for example, less than 2.

Specifically, when the reference values illustrating the colors of each color sample inside the color chart are disposed as the dots inside the L*a*b* color space, and each distance from each dot to the closest dot or the boundary of the L*a*b* color space, the color sample may be selected so that the longest distance is less than 2 times of the shortest distance. Accordingly, deviation in the determined color space, such as the L*a*b* color space, is suppressed with respect to the color of the color sample which constitutes the color chart. In addition, there is a case where the plural pixels correspond to one color sample, and there is a case where the gradation values of each of the pixels are different from each other according to unevenness of the pigment. However, the gradation value of the pixel included in one color sample may be assumed as the same value as the reference value. In this case, an average value or a mode value of the gradation value of the pixel included in one color sample may be used as the reference value of the color sample.

2-7. Modification Example 7

While the reading portion 3 reads the color sample, the holding member 2 is not necessary to be stopped. The reading portion 3 may continuously read the color sample while the holding member 2 rotates. The reading portion 3 may read the plural color samples held by the holding member 2 when being rotated.

2-8. Modification Example 8

The first side surface 21 or the second side surface 22 may not be one. For example, as illustrated by a dashed line in FIG. 1, around the axis O, a first side surface 21a may be provided at a position where the first side surface 21 is rotated by 180 degrees with respect to a plane that intersects the axis O, and the second side surfaces 22 and 22a may be provided on both sides. If the same color samples are held by the second side surfaces 22 and 22a, the rotation angle which is necessary for one time of calibration may be 180 degrees.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus, comprising:
a reading portion which reads an image and generates gradation values of each pixel;
a calculation portion which calculates a coefficient group that allows the gradation values of each pixel generated as the reading portion reads a reference image which becomes a reference of correction, to be close to the gradation values of the pixels which correspond to image data forming the reference image, divides a plurality of regions including an overlapped part in which the reference images are overlapped with each other, and calculates the coefficient group in each region; and
a correction portion which corrects the gradation values of each pixel generated as the reading portion reads a correction target image to be a target of correction, and corrects the gradation values of the correction target which correspond to the gradation values of the pixels of the overlapped part using the coefficient group calculated by the calculation portion in each region including the overlapped part.

2. The image reading apparatus according to claim 1, wherein the correction portion corrects the gradation values of the correction target which correspond to the gradation values of the pixels of the overlapped part, using the coefficient group calculated by the calculation portion in each region including the overlapped part and a weighting factor of the pixel in each region.

3. The image reading apparatus according to claim 1, wherein the correction portion selects any one of each coefficient group calculated in each region by the calculation portion based on representative values in each region of a difference between the gradation values of each pixel generated as the reading portion reads the reference image and the gradation values of corresponding pixels in the image data forming the reference image, and corrects the gradation values of the correction target using the selected coefficient group.

4. The image reading apparatus according to claim 3, wherein the correction portion obtains quantiles of the differences as the representative value of the difference in each region, and corrects the gradation values of the correction target using the coefficient group calculated with respect to the region having a small quantile.

5. The image reading apparatus according to claim 3, wherein the correction portion obtains a maximum value of the difference as the representative value of the difference in each region, and performs correction using the coefficient group calculated with respect to the region having a small maximum value.

6. The image reading apparatus according to claim 1, wherein the reference image is held on a medium having a curvature which circulates at a reading position by the reading portion.

7. The image reading apparatus according to claim 6, wherein, when the medium circulates, the reading portion reads the reference image.

8. The image reading apparatus according to claim 1, wherein, in the reference image, when a plurality of gradation values included in the reference image in each region are disposed as dots inside a color space separated by a determined boundary, a ratio of distances from each dot to a closest dot or the boundary is less than 2.

9. A medium, comprising:
the medium has the reference image which is used in the image reading apparatus according to claim 1,
wherein, when a plurality of gradation values included in the reference image in the region are disposed as dots inside a color space separated by a determined boundary, a ratio of distances from each dot to a closest dot or the boundary is less than 2.

* * * * *